(12) United States Patent
McKinley (10) Patent No.: US 9,483,400 B2
(45) Date of Patent: Nov. 1, 2016

(54) MULTIPLEXED MEMORY FOR SEGMENTS AND PAGES

(71) Applicant: Microsoft Technology Licensing, LLC, Redmond, WA (US)

(72) Inventor: Kathryn S. McKinley, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 14/257,765

(22) Filed: Apr. 21, 2014

(65) Prior Publication Data

US 2015/0301952 A1    Oct. 22, 2015

(51) Int. Cl.
*G06F 12/02* (2006.01)
*G06F 12/10* (2016.01)
*G06F 12/12* (2016.01)
*G06F 12/08* (2016.01)

(52) U.S. Cl.
CPC ............. *G06F 12/08* (2013.01); *G06F 12/023* (2013.01); *G06F 12/109* (2013.01); *G06F 12/1027* (2013.01); *G06F 12/1036* (2013.01); *G06F 12/126* (2013.01); *G06F 12/0844* (2013.01); *G06F 2212/1044* (2013.01); *G06F 2212/657* (2013.01)

(58) Field of Classification Search
CPC ....... G06F 12/1009–12/1018; G06F 12/1036; G06F 12/109
See application file for complete search history.

(56) References Cited

U.S. PATENT DOCUMENTS

| | | | | |
|---|---|---|---|---|
| 4,084,227 A | * | 4/1978 | Bennett | G06F 12/1036 711/200 |
| 4,279,014 A | * | 7/1981 | Cassonnet | G06F 12/1018 711/206 |
| 4,730,249 A | * | 3/1988 | O'Quin, II | G06F 12/1009 711/E12.059 |
| 5,159,678 A | * | 10/1992 | Wengelski | G06F 8/41 711/153 |

(Continued)

FOREIGN PATENT DOCUMENTS

GB    1169724 A  *  11/1969  ........... G06F 12/109

OTHER PUBLICATIONS

Madhusudhan Talluri. Use of Superpages and Subblocking in the Address Translation Hierarchy. 1995. University of Wisconsin—Madison. Thesis.*

(Continued)

*Primary Examiner* — Nathan Sadler
(74) *Attorney, Agent, or Firm* — Steve Wight; Sandy Swain; Micky Minhas (57) ABSTRACT

Disclosed herein are systems and methods for paging to a direct segment maintained by a multiplexed TLB. The multiplexed TLB defines a direct segment to directly map a virtual address range to a physical address range, which increases the reach of the multiplexed TLB. A partition code is maintained in the multiplexed TLB to indicate usage of the direct segment by an associated process. A management process, such as a system pager, uses the unused part of the direct segment for storing paged data. As the process continues to use more of the direct segment, paged data stored in the previously unused part of the direct segment can be evicted from memory or moved elsewhere in memory so that the process can continue to use the direct segment.

20 Claims, 6 Drawing Sheets

(56) References Cited

U.S. PATENT DOCUMENTS

| | | | |
|---|---|---|---|
| 5,440,710 A | 8/1995 | Richter et al. | |
| 5,530,829 A | 6/1996 | Beardsley et al. | |
| 5,539,899 A | 7/1996 | Huynh et al. | |
| 5,895,503 A * | 4/1999 | Belgard | G06F 12/1036 711/200 |
| 6,587,936 B1 * | 7/2003 | Rivers | G06F 12/0215 711/170 |
| 6,629,111 B1 * | 9/2003 | Stine | G06F 12/1036 |
| 8,321,638 B2 | 11/2012 | Van Riel et al. | |
| 8,417,912 B2 | 4/2013 | Olszewski et al. | |
| 2005/0188176 A1 * | 8/2005 | Chiang | G06F 12/1036 711/206 |
| 2007/0126756 A1 * | 6/2007 | Glasco | G06F 12/1027 345/620 |

OTHER PUBLICATIONS

IEEE 100: The Authoritative Dictionary of IEEE Standarsd Terms. Dec. 2000. IEEE. 7$^{th}$ ed. pp. 789-790.*

William Stallings. Computer Organization and Architecture: Designing for Performance. 2010. Pearson Education. 8$^{th}$ ed. pp. 288-293.*

Basu, et al., "Efficient Virtual Memory for Big Memory Servers", In Proceedings of the 40th Annual International Symposium on Computer Architecture, Jun. 23, 2013, 12 pages.

Dally, William, "A Fast Translation Method for Paging on top of Segmentation", IEEE Transactions on Computers, vol. 41, No. 2, Feb. 1992, pp. 247-250.

* cited by examiner

MULTIPLEXED MEMORY FOR SEGMENTS AND PAGES

BACKGROUND

Translation Lookaside Buffers (TLBs), used to translate virtual addresses of a process to physical addresses of memory, are important to virtual memory performance. TLBs often lie on the critical path of a processor's pipeline, and are thereby restricted to operating within a short window of time. Consequently, the number of pages cached in a TLB is also limited to ensure that translation can occur in the short window of time. The amount of memory that can be reached by the number of pages cached, called the TLB reach, is therefore correspondingly limited.

But even as memory device sizes grow and memory consumption per process grows, the short window of time and other constraints of the TLB have not relaxed; thus the TLB reach has not grown at a pace that corresponds to the growth of memory. The limited number of pages cached by the TLB is a performance bottleneck for today's workloads, causing significant degradation of virtual memory performance.

One solution to increase TLB reach is to increase the number of pages cached in the TLB. But adding more pages can add correspondingly more time to a lookup, making it difficult to achieve short pipeline cycle times. Larger TLB caches are also problematic because they can also significantly increase power consumption, expense, and the production of heat.

Another solution is to increase the size of memory addressed by a page, often called superpages, large pages, or huge pages. But superpages foster fragmentation, causing internal fragmentation when only a part of the page is put to use and external fragmentation when holes between superpages are too small to put to effective use.

Another solution is to use a multiplexed TLB, including a direct segment that translates addresses in parallel to a traditional associative cache-only TLB. Pages within the direct segment, defined by a contiguous virtual address range spanning from a base address to a limit address, can be directly translated onto a contiguous physical address range. This increases the TLB reach by an arbitrarily large amount corresponding to the size of the direct segment. But each direct segment belongs to a particular process, and the mapped memory is not accessible for important system usage such as paging.

BRIEF SUMMARY

Embodiments of the present disclosure introduce techniques to share a part of a direct segment for system paging, increasing TLB reach using an arbitrarily large virtual address space defined by a direct segment. The direct segment is pinned for a process, so memory access to the direct segment by the process guarantees a TLB hit. A partition code divides the direct segment into an occupied part and an unused part, so that the occupied part is treated as a direct segment and the unused part is treated as space available for demand paging, and together they form a multiplexed memory. The partition code changes as the direct segment is occupied and as the memory referenced by the direct segment is freed to grow and diminish the size of the direct segment. As the partition code changes to include a virtual address of the unoccupied part, any existing paged data at the virtual address is evicted and cleared, thus enabling lazy occupation of the pages within the segment while promoting inter-process security.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic (e.g., Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs)), and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Embodiments of the present disclosure include techniques implemented using hardware, software, and combinations thereof to share a direct segment of a multiplexed TLB to enable paging, by a system pager, to the parts of the direct segment not currently in use by the segment. A multiplexed TLB maintains a base address and a limit address to describe a contiguous virtual address range defining the direct segment. The multiplexed TLB pins addresses within the direct segment for fast translation without performing a page walk, which significantly reduces translation times. For example, translation of a pinned address occurs within a pipeline clock cycle. The pinned addresses may be resolved by the multiplexed TLB without consulting hardware functional units outside of the multiplexed TLB. A peak address or partition address or a mask is maintained in the multiplexed TLB and divides the direct segment into a part available for immediate use by the process, a part being used for paging by the system pager, and a part available to be repurposed for paging by the system pager. The part available for immediate use and the part available to be repurposed for paging may overlap.

Embodiments of the present disclosure impose only incremental costs for accessing individual pages within the direct segment, costs that are similar to those experienced using traditional demand paging to page contents upon access rather than up-front. This spreads the costs over time based on demand and need.

TLB reach is increased not only for the process owning a direct segment, but also for the system pager that may share the direct segment. Internal fragmentation is reduced because the otherwise unused part of a direct segment may be used to page other data. External fragmentation is reduced because a direct segment may take any size and generally be placed over contiguous virtual address ranges that already include paged data. Allocation may occur without delay because pages within the direct segment are prepared on demand rather than upon allocation. Direct memory segments may be moved relatively easily because only pages in actual use need to be moved, allocation is fast, and external fragmentation impediments are relaxed. Compaction is similarly simplified.

The owning process does not need to precisely determine the size of the direct segment upon allocation because the direct segment may grow or shrink and because the unused part of the direct segment may be put to productive use. In some embodiments, segments may be intentionally oversized since the use of the unused part of the segment is available for paging.

Example Computing System

Figure 1:
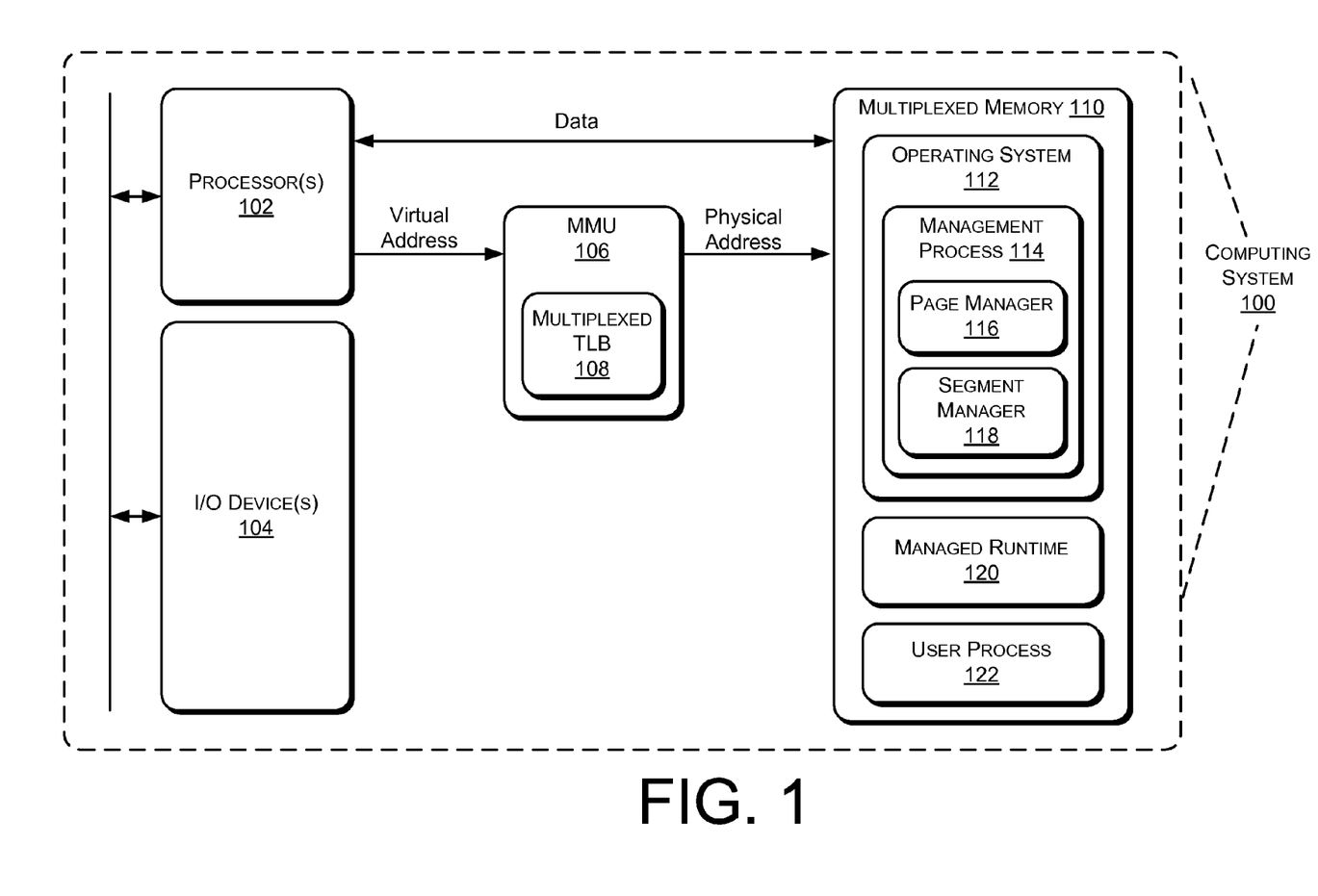
FIG. 1 illustrates a block diagram depicting an example computing system having multiplexed memory to share segments and pages.

FIG. 1 illustrates a block diagram depicting an example computing system 100 having multiplexed memory to share segments and pages. The computing system 100 may represent a diverse variety of device types and is not limited to any particular type of device. Examples of the computing system 100 may include but are not limited to stationary computers, mobile computers, embedded computers, or combinations thereof. Example stationary computers may include desktop computers, work stations, server computers, personal computers, thin clients, terminals, game consoles, personal video recorders (PVRs), set-top boxes, or the like. Example mobile computers may include laptop computers, tablet computers, wearable computers, implanted computing devices, telecommunication devices, automotive computers, personal data assistants (PDAs), portable gaming devices, media players, cameras, or the like. Example embedded computers may include network enabled televisions, integrated components for inclusion in a computing device, appliances, microcontrollers, digital signal processors, or any other sort of processing device, or the like.

The computing system 100 includes processor(s) 102 operably connected to I/O device(s) 104. The processor(s) 102 is configured to execute computer instructions. The I/O device(s) 104 may include devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). The I/O device(s) 104 may also include one or more network interface(s) to enable communications between computing system 100 and other networked devices. Such network interface(s) may include one or more network interface controllers (NICs) or other types of transceiver devices to send and receive communications over a network.

The processor(s) 102 provides a virtual address to a Memory Management Unit (MMU) 106 for address translation. The MMU 106 uses a multiplexed Translation Lookaside Buffer (TLB) 108 to translate the virtual address to a physical address of a multiplexed memory 110. In some embodiments, the MMU 106, including the multiplexed TLB 108, may be included on the processor(s) 102, for example as an integrated component of the processor(s) 102 or physically located with the processor(s) 102. In other examples, the MMU 106 may be separate from the processor(s) 102.

Figure 2:
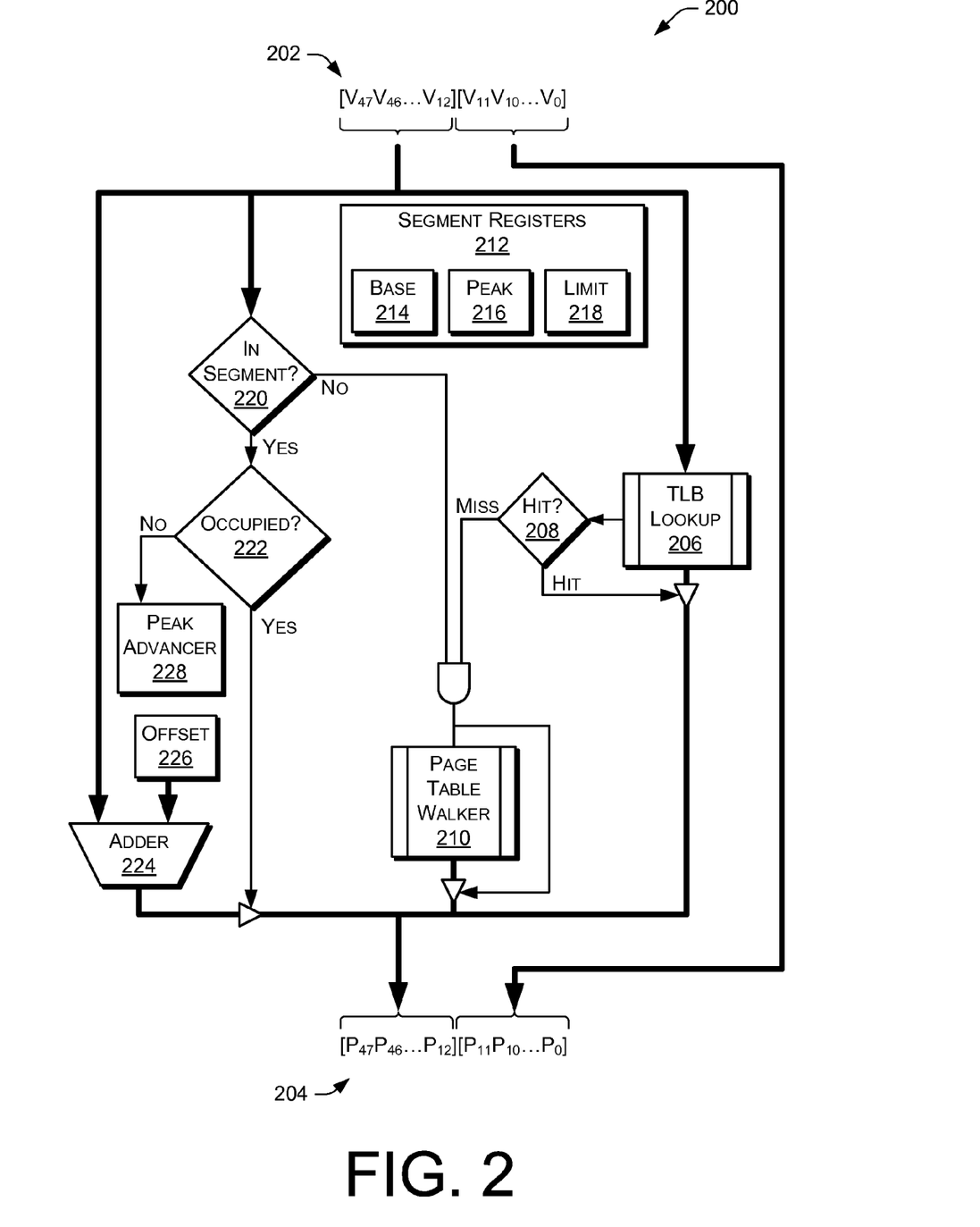
FIG. 2 illustrates a block diagram depicting an example implementation of a multiplexed TLB to share a direct segment.

The multiplexed TLB 108 may be implemented as described in the example of FIG. 2. The multiplexed TLB 108 looks-up the virtual address using both an associative cache and direct segment lookup. A direct segment maps a contiguous virtual address range onto a contiguous physical address range using relatively simple arithmetic. Lookup within the direct segment includes checking whether the virtual address is within a base address and a limit address. When the virtual address is within the direct segment, the physical address may be generated by adding an offset to the virtual address. The direct segment is pinned in the multiplexed memory, which guarantees that an address that falls between the base and limit is a TLB hit and a memory hit for any addresses within the segment. The reach of the multiplexed TLB 108 is thus increased to include the reach of the associated TLB cache and the reach of the arbitrarily large direct segment. The MMU 106 may translate the virtual address to the physical address within a short time, for example the time limit imposed by the pipeline cycle time.

The physical address is provided from the MMU 106 to the multiplexed memory 110, optionally along with data provided from the processor 102, to perform the memory access. In some examples, the memory access may include reading the multiplexed memory 110, in which case the data would be provided from the memory to the processor. The multiplexed memory 110 may be implemented using one or more caches, not shown. The multiplexed memory 110 and/or the one or more caches may be included on the processor(s) 102, physically located on the processor(s) 102 for example as an integrated component of the processor(s) 102, or physically located with the processor(s) 102. In other examples, the multiplexed memory 110 and/or the one or more caches may be separate from the processor(s) 102.

The multiplexed memory 110 stores program instructions that are loadable and executable on the processor(s) 102, as well as data generated during execution of, and/or usable in conjunction with, these programs.

In the illustrated example, multiplexed memory 110 stores an Operating System (OS) 112, which provides basic system functionality of the computing system 100 and, among other things, provides for operation of the other programs and program modules of the computing system 100. The OS 112 includes a page manager 116 to support and manage demand paging. The page manager 116 tracks resident virtual memory pages. The page manager 116 tracks nonresident virtual memory pages in a backing store and from memory-mapped files. The page manager 116 may coordinate with the MMU 106 and/or the multiplexed TLB 108 to perform some or all of a page table walk to update the multiplexed TLB 108 to include data to translate a requested address, such as performed in response to a TLB miss. The page manager 116 may use unused parts of direct segments to perform paging. Unused memory is described further with respect to FIGS. 3 and 4.

The OS 112 also includes a segment manager 118 to support and manage the multiplexed TLB 108. The segment manager 118 may manage segment registers, as further described with respect to FIG. 2.

Figure 3:
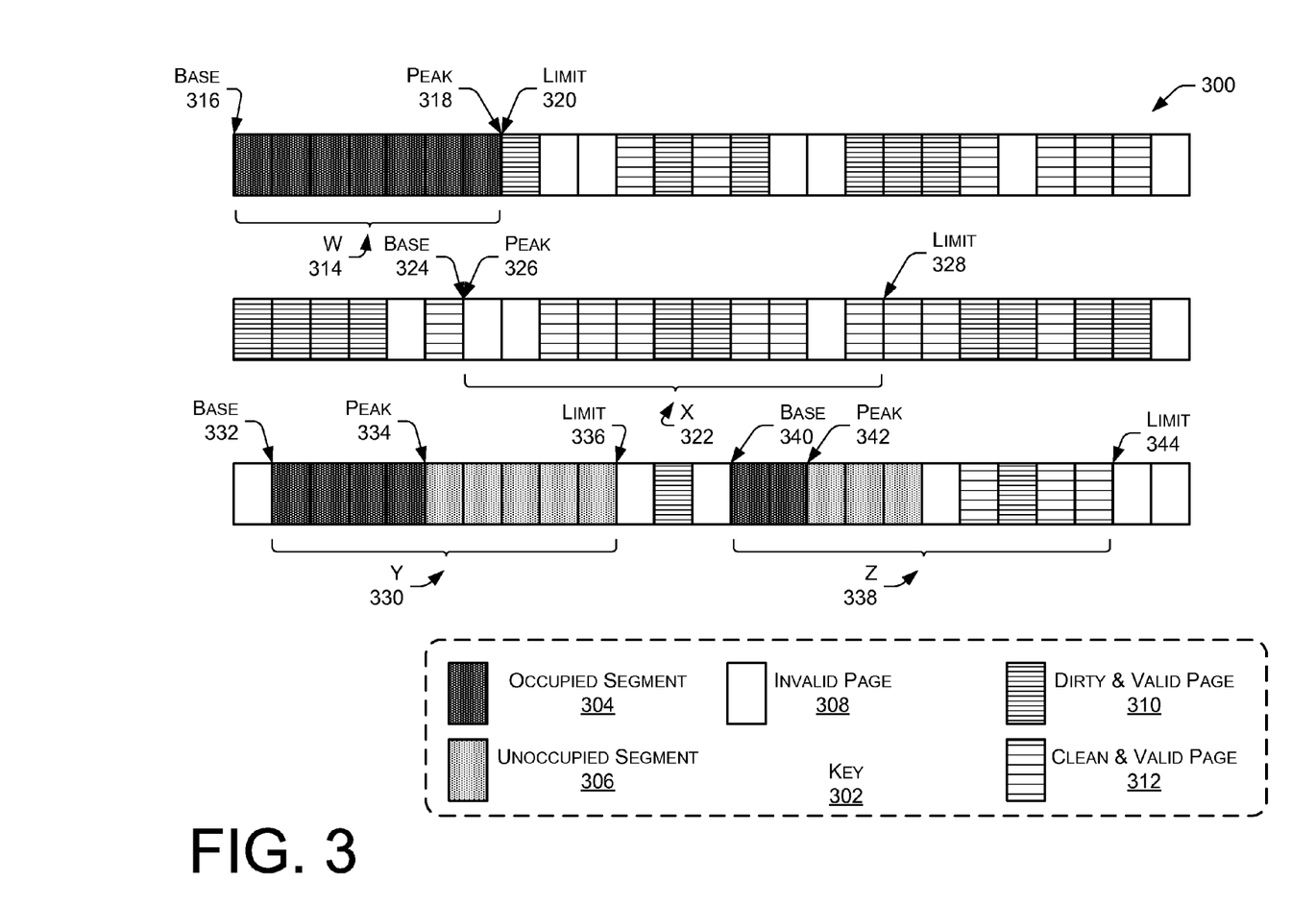
FIG. 3 illustrates a block diagram depicting example page and segment states in a multiplexed virtual address space.

In the example of computing system 100, the page manager 116 maintains segment registers of the multiplexed TLB 108, including registers such as a base address register, a limit register, a partition code, and/or a peak register, as described further with respect to FIGS. 2 and 3. Maintenance of the segment registers may include updating state information and maintaining a state machine, or the like, to describe the state of a direct segment, as described further with respect to FIG. 4.

In the illustrated example, multiplexed memory 110 stores a managed runtime 120. Examples of the managed runtime include the MICROSOFT .NET FRAMEWORK COMMON LANGUAGE RUNTIME™ and the ORACLE JAVA RUNTIME ENVIRONMENT™, as well as many other managed runtimes. The managed runtime 120 may use one or more segments. The managed runtime 120 may use unused parts of direct segments, similar to the example described above for the page manager 116. Accordingly, the managed runtime 120 may maintain the unused parts of direct segments and maintain the segment registers.

As used throughout this application, a management process 114 may comprise the page manager 116, the segment manager 118, the managed runtime 120, or combinations thereof.

In the example of computing system 100, a user process 122 may be associated with the direct segment, for example by allocating the direct segment. The allocation could be performed as a system call to the management process 114, such as the OS 112 or by the managed runtime 120. Although the direct segment is allocated to the user process 122, the multiplexed TLB 108 may allow the page manager 116 to use pages for the same or other processes in the unused part of the direct segment. In some embodiments, the user process 122 may share the direct segment with the management process 114, but access by the user process 122 takes priority over the management process 114 and causes the occupation of some or all of the direct segment by the user process 122.

Computer-Readable Media

Depending on the configuration and type of computing device used, multiplexed memory 110 of the computing system 100 in FIG. 1 may include volatile memory (such as random access memory (RAM)) and/or non-volatile memory (such as read-only memory (ROM), flash memory, etc.). Memory 100 may also include additional removable storage and/or non-removable storage including, but not limited to, flash memory, magnetic storage, optical storage, and/or tape storage that may provide non-volatile storage of computer-readable instructions, data structures, program modules, and other data for computing system 100.

Multiplexed memory 110 is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

Example Multiplexed TLB

FIG. 2 illustrates a block diagram depicting an example implementation 200 of the multiplexed TLB 108 to share a direct segment. The multiplexed TLB 108 translates a virtual address 202 to a physical address 204. Although the example depicts operations using a subset of the virtual address 202 to translate to a subset of the physical address 204 (i.e. translating $V_{47}$-$V_{12}$ to $P_{47}$-$P_{12}$), other subsets or the entirety of the virtual address 202 may be translated to other subsets or the entirety of the physical address 204.

A TLB lookup 206 translates the virtual address 202 to the physical address 204 using a limited set of cached translations. The TLB lookup 206 may be implemented using a variety of techniques, including a Content Addressable Memory (CAM) and/or other hardware lookup techniques that may include hierarchical lookup structures. The TLB lookup 206 implementation is referenced herein as an associative cache. If the translation is found, then a hit test at 208 will hit and enable the result to be provided as the physical address 204. If the lookup fails, then the hit test at 208 will miss. As with a traditional TLB, the miss triggers a page table walker 210 in response. In the example of FIG. 2, the page table walker 210 is not begun unless a segment lookup also fails, as described further herein.

The associative cache has a limited number of entries. New entries may be added to the associative cache by writing to unused entries or replacing a used entry. The associative cache is full when all of the entries are used or otherwise set aside. The associative cache often holds only part of a complete page table, so that TLB misses at the associative cache may require a page walk, for example as performed by the page table walker 210. A successful page walk evicts an entry from the associative cache to make room for the page walk result, which is stored in the associated cache. The page walk relies on the complete page table as stored by the management process 114, the page manager 116, the managed runtime 120, or combinations thereof. The complete page table tracks all pages in memory as well as indications of which processes have permission to access the pages. The associative cache may be configured to share entries for multiple processes.

The multiplexed TLB 108 also performs a direct segment lookup in parallel to the TLB lookup 206 to translate addresses within the direct segment. Addresses are only valid in one direct segment or in a page table, such that address translation is not ambiguous. Segment registers 212 define a base 214 of the direct segment, a partition code 216 of the direct segment, and a limit 218 of the direct segment. Thus, the segment registers 212 define the address range of the direct segment as the contiguous virtual address range spanning from the base 214 to the limit 218. In some embodiments, the direct segment may be defined as a base address and a length. In some embodiments, the direct segment may be defined as a base page address and a length in page numbers. In some embodiments, the partition code 216 may include a peak address, an offset from the base 214, an offset from the limit 218, a percentage of the direct segment, or a mask. Either of the base 214 or the limit 218 may be referenced as a limit of the direct segment. The segment registers 212 may specify any subset of the address space defined by the segment registers 212, including the full length of the virtual address 202.

The in segment test 220 may be performed by checking that the virtual address 202 is greater than or equal to the base 214 and less than the limit 218, and/or with a mask associated with the partition code. If the virtual address is not in the segment, the no branch is taken, which, together with a TLB miss at the hit test 208, activates the page table walker 210 to resolve the miss. Alternatively, if the virtual address 202 falls within the direct segment, the in segment test 220 proceeds via the yes path.

The direct segment is pinned and any virtual address within the direct segment is guaranteed to translate without needing to use the page table walker 210. Despite this guarantee, not all of the direct segment may be ready for immediate access by the requesting process. The user process 122 is only permitted immediate access to an occupied part of the direct segment, defined by the partition code 216 which partitions the direct segment into the occupied part and an unused part. A management process 114 may use the unused part for paged data. The user process 122 may access the unused part after preparing the page, for example by causing the removal of paged data.

In some embodiments, the partition code 216 includes a peak address that defines the unused part of the direct segment as the contiguous virtual address range spanning from the base 214 to the peak address. The occupied test 222 compares the virtual address 202 with the peak address. When the virtual address 202 is within the occupied part of the direct segment, the test 22 proceeds to enable output from an adder 224 that adds an offset 226 to the virtual address 202 to generate the physical address 204. Various parts of this disclosure reference a "peak" for illustrative purposes as a non-limiting example of the partition code 216. Other forms of the partition code 216 may be substituted for the "peak" in these parts of the disclosure, however some modifications may be needed to comply with the descriptions provided herein.

In some embodiments, a partition address may be evaluated based, at least in part, on the partition code 216. The partition address is treated similar to the peak address described above, defining the unused part of the direct segment spanning from the partition address to a limit. The partition address may be evaluated as an offset from the base 214, as an offset from the limit 218, as a percentage of the direct segment, or the like. When the partition code includes a partition address, evaluation of the partition code may include listing the partition address. The partition address may be evaluated in response to a change to the segment registers 212.

In some embodiments, the partition code 216 includes a mask to partition the direct segment. For example, the mask may comprise bits, one or more of the bits corresponding to a part of the direct segment and indicating whether the part is occupied or unoccupied or paged in segment according to FIG. 4. Accordingly, at the occupied test 222, the bit corresponding to the virtual address 202 is read to determine whether the virtual address 202 is in the occupied part of the direct segment.

When the virtual address 202 is within the segment, but outside of the occupied part of the direct segment, the multiplexed TLB 108 intercedes to provide safe access for the user process 122 to the virtual address 202. In some embodiments, the page is in state 404, paged in segment, and is prepared before use by the process. In some embodiments, the page is in the unoccupied segment state and need not be prepared. The occupied test 222 follows the no branch to peak advancer 228. The direct segment, being shared with the management process 114, potentially contains data from another process, which is indicated by the state 404, paged in segment. In this case, the page is evicted, written-back, and/or optionally cleared before the page(s) may be given to the user process 122. This process of evicting data, writing-back data, and clearing data from the page, when necessary, is referenced herein as preparing the page.

The peak advancer 228 may be implemented in hardware, software, or combinations thereof. In some embodiments, the peak advancer 228 may cause a segment-page fault to be handled by the operating system 112, including the page manager 116. The page manager 116 may cause the preparation of the accessed pages, for example the pages between a peak address and the virtual address 202, as necessary. Once prepared, the partition code 216 may be changed to include the virtual address, effectively enlarging the occupied part of the direct segment to include the virtual address 202. In some examples, the direct segment may grow, shrink, or be moved as directed by the management process 114. In some examples, when the segment shrinks, the page state changes to state 408, unoccupied segment. The command that caused the segment-page fault may be resumed or restarted in the context of the user process 122. Accordingly, the direct segment is made available to the user process 122 in its entirety, though incremental costs of access to unoccupied parts may be incurred at the time of access.

In some embodiments, the occupied test 222 may identify that although the virtual address is not currently occupied, the accessed pages are already prepared, and may cause the partition code 216 to be changed to include the virtual address 202 without causing a segment-page fault. In some embodiments, when the page need not be prepared, it will be in the state 408, unoccupied segment.

Example Page States

FIG. 3 illustrates example page and segment states 300 of direct segments in a multiplexed virtual address space. Key 302 depicts various combinations of parts of the page state. The state of each page may be stored in a data structure of the management process 114, stored with the paged data, or derived.

The non-limiting example of FIG. 3 depicts partition codes as peak addresses for illustrative purposes. Other partition code types may be substituted by enforcing appropriate corresponding rules and procedures.

An occupied segment 304 shows a valid direct segment memory and is in use by a process associated with the direct segment. All references to virtual addresses labeled as an occupied segment 304 are mitigated by the direct segment lookup part of the multiplexed TLB 108. Pages labeled as occupied segments are immediately accessible by the associated process, for example without first causing or handling a segment-page fault. However, pages labeled as occupied segment are not required to be in actual use by the associated process.

All references to the segments, for example segments 314, 322, 330, and 338, are mitigated by the direct segment lookup part of the multiplexed TLB 108, which may cause advancement of the peak associated to the direct segment.

An unoccupied segment 306 underlies valid direct segment memory and although not used by the process associated with the direct segment, the process has ownership of the unoccupied segment 306.

An invalid page 308 indicates that the page is no longer associated with any process, though the page may contain remnants of sensitive data belonging to an unidentified process. Prior to use of the invalid page 308, the data may be cleansed, such as by overwriting with zeros.

A dirty and valid page 310 is currently in use by a management process 114 to store paged data. The page is labeled as dirty to indicate that the paged data is modified from the backing data store. Preparation to include a dirty and valid page 310 into the occupied part of a direct segment includes writing-back the data to the backing store.

A clean and valid page 312 is currently in use by a management process 114 to store paged data. The page is labeled as clean to indicate that the paged data is the same as the backing data store.

Segment W 314 depicts a fully occupied segment starting at base 316 and having peak 318 equal to limit 320. No underlying page of the segment W 314 is in use by the page manager 116. All references by the process associated with the segment W 314 will generate a TLB segment hit without first generating (and causing to be handled) a segment-page fault.

Segment X 322 depicts a segment immediately after initialization, having base 324 equal to peak 326. The segment X 322 spans from base 324 to limit 328 and includes peak 326. The underlying pages are in various states of invalid, clean and valid, and dirty and valid. The multiplexed TLB 108 continues to service hits to these pages. The first reference, by a process associated with the segment X 322, to an address in the segment X 322 is a segment miss that will cause the peak 326 to advance. The multiplexed TLB 108 may issue a segment-page fault to the OS 112. The OS 112 may prepare the underlying page(s) based on its state (e.g., write back, zero, etc.). The OS 112 then advances the peak 326 and performs the reference (write or read).

Segment Y 330 depicts a partially occupied segment, where all pages of the segment are occupied or unoccupied segment pages. The segment Y 330 spans from base 332 to limit 336 and includes peak 334. These pages are controlled by an associated application, references to pages of the segment Y 330 do not cause a segment miss, and no underlying page contains paged data in any state. All references to the segment X 322 by the process are hits. When the process references the unoccupied part of the segment, the multiplexed TLB 108 updates the peak 334 and updates the page state. The management process 114 may repurpose pages that are unoccupied in the segment by changing their paged state and then using them for paging if it so desires.

Segment Z 338 depicts a partially occupied segment, where some underlying pages are occupied and unoccupied segment memory and some underlying pages are in various stages of invalid, clean and valid, and dirty and valid. The segment Z 338 spans from base 340 to limit 344 and includes peak 342. When the peak advances into paged memory, the multiplexed TLB 108 issues a segment-page fault and takes appropriate action before satisfying the read or write.

FIG. 3 also illustrates that multiple segments may occupy a virtual address space. The multiplexed TLB 108 may be implemented with multiple direct segment lookup hardware, which may be implemented in parallel. In some examples, a process may be associated with one or more direct segments and load each direct segment into segment registers associated with direct segment lookup hardware. In some examples, a process may switch between multiple direct segments.

Page State Diagram

Figure 4:
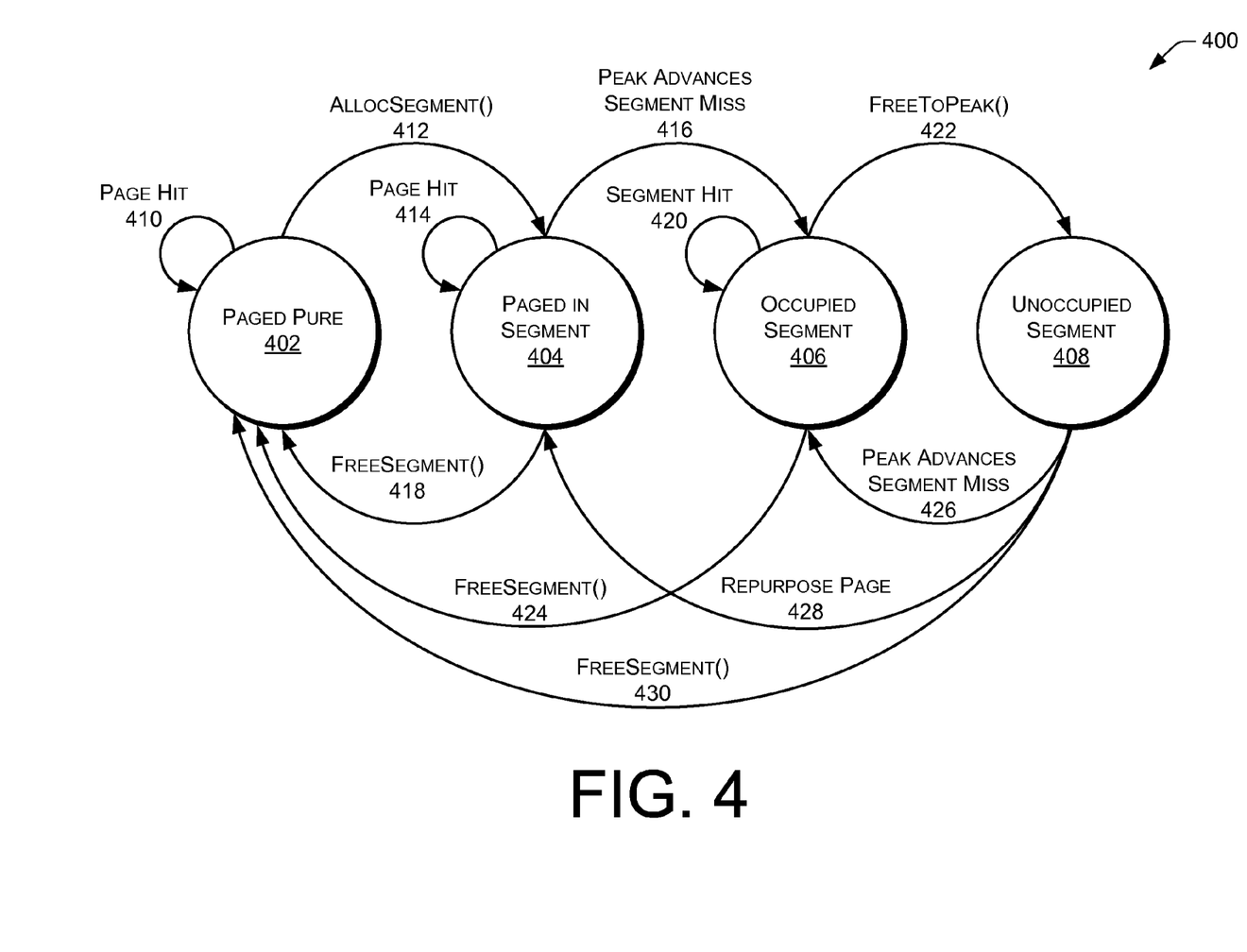
FIG. 4 illustrates a state diagram depicting example page states and page state transitions associated with a page in a multiplexed virtual address space, which may be in use by a segment or in use by paging.

FIG. 4 illustrates a state diagram 400 depicting some of the example page states and page state transitions associated with a page in a multiplexed virtual address space both within and outside of a direct segment. Paging systems typically specify that the page is valid and clean, valid and dirty, or invalid. Paged multiplexed memory may also specify that the page is paged pure at state 402, paged in segment at the state 404, occupied segment at state 406, or unoccupied segment at the state 408. A page in a segment is called unused by the segment if it is either unoccupied segment state 408 or paged in segment state 404. Two bits may be used to represent these states. The state 406, occupied segment, and the state 408, unoccupied segment, are described above, particularly with reference to FIG. 3.

The state 402, paged pure, indicates that no segment overlays an associated page. The page is available to the management process 114 for managing paged memory. References to virtual addresses on this page are mitigated by the MMU 106 and/or OS page tables. Access to the associated page causes a page hit, transition 410, a self transition, staying in the state 402, paged pure state. Calls to AllocSegment( ) trigger a transition 412 to the state 404, paged in segment, causing the inclusion of the associated page in a direct segment.

The state 404, paged in segment, indicates that a segment overlays an associated page, the associated page has not been occupied by an associated process, and that the associated page may continue to be used for paging by the management process 114. The multiplexed TLB 108 includes this page in the pinned part defined by the segment registers. Access to the associated page by the management process 114 through the TLB lookup 206 or Page Table Walker 210 causes a page hit, transition 414, staying in the state 404, paged in segment. This embodiment keeps using the pages until the direct segment accesses them. The management process 114 may move an associated page into other parts of memory, which may be done lazily, for example using an asynchronous process. Moving the associated page may not require writing back or invalidating the associated page, which may facilitate use of the associated page as a destination for moved pages associated with the paged in segment state. Access to the associated page by the associated process using a virtual segment address 202 may transition 416 to the state 406, occupied segment. During the transition 416 the partition code is updated and a segment-page miss is handled by the multiplexed TLB 108 by preparing the associated page and including the associated page in the occupied part of the segment, for example by advancing a peak address. Beginning again from the state 404, paged in segment, a call to FreeSegment( ) causes transition 418 to the state 402, paged pure. The transition 418 causes the management process 114 to reclaim the segment, for example when the associated process terminates or upon an explicit call.

The state 406, occupied segment, indicates that the associated page is included in the pinned part of the multiplexed TLB 108 defined by the segment registers. Access to the associated page by the associated process using a valid virtual segment address 202 causes a segment hit from a direct segment lookup, transition 420 back to the state 406, occupied segment. A call to FreeToPeak( ) causes the associated page to be removed from the occupied part of the associated direct segment, causing transition 422 to state 408, unoccupied segment. A call to FreeSegment( ) causes transition 424 to the state 402, paged pure. During the transition 424 the management process 114 reclaims the segment, for example when the associated process terminates or upon an explicit call.

The state 408, unoccupied segment, indicates that the associated page is included in the pinned part of the multiplexed TLB 108 defined by the segment registers. The associated page is available to the associated process without preparation (i.e., without flushing or clearing). For example, transition 426 to the state 406, occupied segment, occurs when the segment misses, for example in response to a segment-page fault. The associated page is also available to the management process 114 to repurpose via transition 428 to the state 404, paged in segment. In some embodiments, the management process 114 may wait until all other pages of the associative cache are in use before repurposing unused pages of the direct segment. A call to Free Segment( ) causes transition 424 to the state 402, paged pure, called when the management process 114 reclaims the segment, for example when the associated process terminates or upon an explicit call.

Illustrative Processes

FIGS. 5, 6, 7, and 8 are flow diagrams depicting example processes as described further below. The example processes are performed on the computing system 100 as described herein. The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions encoded on one or more computer-readable media that, when executed by one or more processors, enable the one or more processors to perform the recited operations. Generally, computer-executable instructions include routines, programs, objects, modules, components, data structures, and the like that instruct performance of particular functions or implement particular abstract data types. The order in which the operations are described is not intended to be construed as a limitation, and any number of the described operations may be executed in any order, combined in any order, subdivided into multiple sub-operations, and/or executed in parallel to implement the described process.

Figure 5:
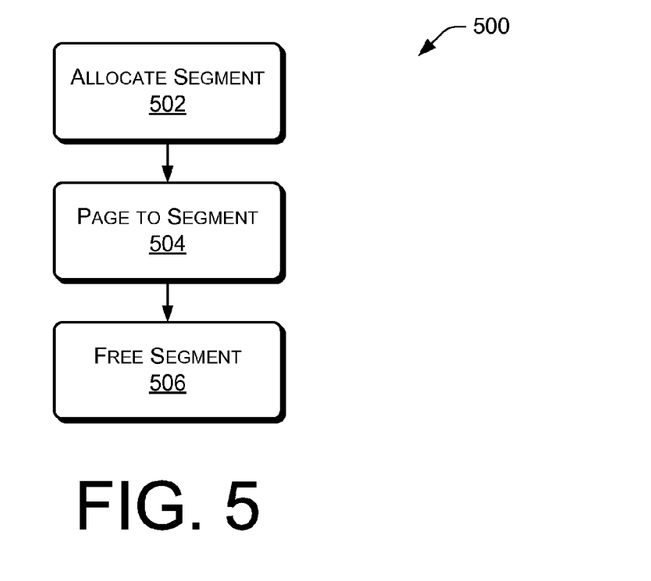
FIG. 5 is a flow diagram illustrating an example process for sharing a direct segment with a paged memory.

FIG. 5 is a flow diagram illustrating an example process 500 for sharing a direct segment with a paged memory.

At allocate segment 502, a direct segment may be allocated, for example in response to a call to AllocSegment( ) as described with respect to the transition 412 of FIG. 4. Creation of the direct segment creates a one-to-one and onto mapping of a contiguous virtual address space defined by the base 214 and the limit 218 onto a contiguous physical address space. Every page of the direct segment has a virtual address in the contiguous virtual address space, thus the virtual addresses 202 of the direct segment fall between the base virtual address and the limit virtual address. The direct segment may be activated in the multiplexed TLB 108 by loading the segment registers 212, including the base 214 and the limit 218. When active, the direct segment is pinned, such that access to a virtual address of the direct segment may be resolved to the corresponding physical address without performing a page walk.

The multiplexed TLB 108 maintains the partition code 216 as part of the segment registers 212. The partition code 216 divides the direct segment into an occupied part and an unoccupied part. The partition code 216 is determined based on actual use of the direct segment by the associated process. The occupied part is available for an associated process to immediately access. The unoccupied part is available for the management process 114 to immediately access. The direct segment may be moved by copying its occupied parts and then pinned elsewhere.

The direct segment may be allocated over unused pages or over pages currently in use for paging by the management process 114, including invalid pages, valid and dirty pages, or valid and clean pages. Allocating a segment over existing paged data introduces a risk that the associated process will use the direct segment and cause the existing paged data to be evicted. Accordingly, an allocation scheme of the management process 114 may select a direct segment that overlays a minimum number of existing paged data. Alternatively, the management process 114 may select a location that maximizes the paged data overlaid by the direct segment, which may allow the paged data to be evicted from the associative cache to relieve pressure on an associative cache while pinning the translations to the paged data. In some examples, a specific amount of pages falling within a newly allocated direct segment may be evicted and may be classified upon creation as either occupied segment (for example by moving a peak address to include the pages) or unoccupied segment in preparation for use by the associated process.

At page to segment 504, a management process 114 may put unused segment space to productive use by paging data to an unused part of the direct segment defined by the partition code 216. The management process 114 may use any page of the unused part. In some examples, the pages furthest from a peak address and closest to the limit 218 are likely to be the last part of the direct segment that may be converted to occupied in response to peak growth, for example as described at the state 416. Therefore the management process 114 may prefer to page to the last part when available. Additionally, the management process 114 may prefer to avoid paging onto unoccupied segment pages, because the other pages are preferred because they already require some degree of preparation prior to occupation by the segment and therefore paging to these other preferred pages helps to limit the amount of preparation required to handle a segment-page fault.

In some embodiments, the management process 114 may page to the unoccupied part of the direct segment and/or to the other preferred available pages. In any case, the management process 114 may page until the preferred location is full and then fall-back on the non-preferred location. In all cases, the page manager enters the pages into the page table for the process and may enter the page in the associative cache.

At free segment 506, the direct segment may be freed, for example as described with reference to FIG. 4, particularly by transitions 424 and 430, FreeSegment( ) Existing paged data in the state 404, paged in segment, transitions to the state 402, paged pure, within the old direct segment. All entries in the associative cache are still valid.

Figure 6:
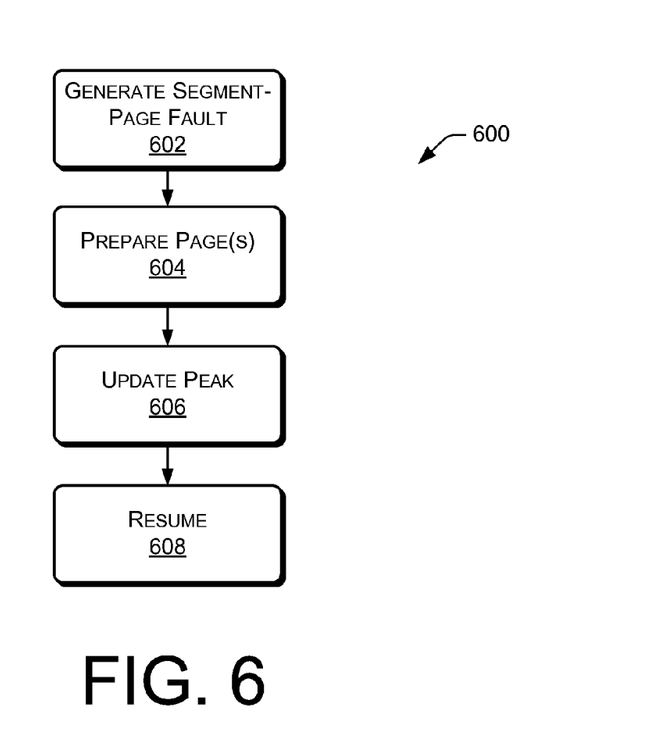
FIG. 6 is a flow diagram illustrating an example process for handling a segment-page fault to grow an occupied part of a direct segment.

FIG. 6 is a flow diagram illustrating an example process 600 for handling a segment-page fault to grow an occupied part of a direct segment.

At generate segment-page fault 602, the multiplexed TLB 108 may signal a segment-page fault, for example following the no branch from the occupied test 222 in response to an access to a page of an unoccupied part of a direct segment by an associated process. The access is caused by a command, which is an instruction or operation that may be reissued or suspended and resumed. The associated process is not guaranteed to have safe access to the unoccupied part, so the segment-page fault is signaled to allow the management process 114 to prepare the accessed page. The segment-page fault may be raised by the multiplexed TLB 108 and may signal the management process 114 to handle the access. In some examples, inclusion of the accessed page in the occupied part of the direct segment may also include pages from a peak address to the accessed page. In some examples, the access to the page may include access to other pages.

At prepare page(s) 604, the accessed pages may be prepared for the associated process to use via intervention of the management process 114. The management process 114 prepares the accessed pages in response to the signaled segment-page fault. Dirty pages in the accessed pages may be written back to the data store, valid pages in the accessed pages may be evicted and made invalid, and invalid pages in the accessed pages may be zeroed or otherwise protected from inadvertent sharing.

In some embodiments, evicting the accessed pages includes moving the accessed pages to another location and/or writing back the accessed pages. For example, other locations associated with the invalid page status may receive the accessed pages. The management process 114 may determine whether to move or write back the accessed pages based on known eviction policies. For example, the eviction policy may make determinations based on the number of invalid pages, how recently the accessed pages have been used, or first in first out considerations.

At update partition code 606, the page(s) are included in the occupied part of the direct segment by updating the partition code 216 to include the page(s).

At resume 608, the command may be resumed or restarted in the context of the associated process so that the access, when executed again, will see the accessed page as occupied and pinned in the direct segment.

Figure 7:
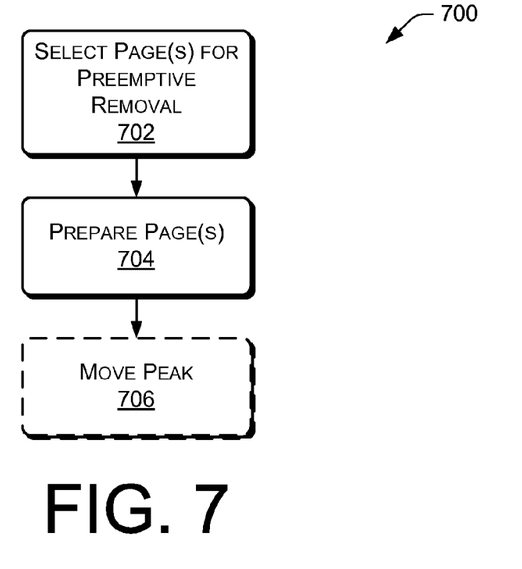
FIG. 7 is a flow diagram illustrating an example process 700 for preemptive eviction of a selected part of unoccupied pages of a direct segment.

FIG. 7 is a flow diagram illustrating an example process 700 for preemptive eviction of a selected part of unoccupied pages of a direct segment.

At select page(s) for preemptive removal 702, the management process 114 may select pages to preemptively remove from an unoccupied part of a direct segment according to a policy or heuristic. Page removal from a segment may include moving a page to another part of memory or may include removing the page from memory and written, if need be, back to a backing store. Preemptive removal may help reduce the number of segment-page faults and/or reduce the cost of handling segment-page faults. Preemptive removal by the management process 114 may occur asynchronously to the process associated with the direct segment or may occur in response to use of the direct segment by the associated process, for example during the handling of a segment-page fault. Removal of a page from a direct segment may include eviction of the page, invalidation of the page, clearing data from the page, or the like.

The page(s) selected for removal may be selected based on maintaining a buffer of a particular distance. For example, the particular distance may be measured by a number of pages from a peak address in an unoccupied part of the direct segment, or the like. The number of pages may be adjusted based on observed usage of the direct segment by the associated process, based on predicted usage, and/or based on a tunable parameter. In some examples, the particular number of pages is based on the write bandwidth or the copy bandwidth of the physical device mapped by the multiplexed TLB 108, for example a memory. In some examples, the particular number of pages is based on the write bandwidth or the copy bandwidth of the underlying data store, for example to cause an appropriately sized write to the data store spread over an appropriate period of time to efficiently perform I/O or to perform memory to memory copying. In some examples, the particular number of pages corresponds to the size of the direct segment and/or the size of the unoccupied part of the direct segment.

In some embodiments, the selected page(s) may be selected using prediction similar to that used for TLB prefetching. For example, communicating processes may signal a message size or may be observed to be sending a message having a size that is expected to be received by the associated process, which may cause the management process 114 to preemptively evict a corresponding size of pages in the direct segment. In another example, multiple similar processes may be observed and the peak growth characteristics of the peak of a first process may inform the preemptive growth characteristics of a peak of a second process, so that recurring segment-page fault patterns may be exploited. In some embodiments, the particular number of pages may be based on the span of successive segment-page faults. In some embodiments, the particular number of pages may be based on a trained Markovian predictive model.

In some embodiments, the selected page(s) are selected in anticipation of a scheduled prefetch. For example, the management process 114 may cause the population of the multiplexed TLB with pages that are likely to be needed, thereby reducing a delay that would otherwise be caused by loading the translations upon demand. The scheduled prefetch may occur at an interval, may occur during processor downtime, or may occur in response to a prefetch command.

At prepare page(s) 704, the selected page(s) are prepared for eviction, similar to the description of prepare page(s) 604. Preparing the selected page(s) may include writing-back dirty pages, evicting pages, invalidating pages, copying pages, and/or zeroing pages. Because the selected page(s) are not under immediate conversion to occupied status, it may not be immediately necessary to evict, invalidate, copy, and/or zero pages, as these steps may be performed relatively quickly during a segment-page fault. In some examples, it may be enough to write-back dirty pages so that subsequent conversion to occupied status may occur without performing costly I/O.

At change partition code 706, which is optional, the partition code 216 is changed to preemptively include one or more of the selected page(s) within the occupied part of the direct segment. This may occur, for example, in cases where the associated process is likely to have an impeding need for a part of the direct segment.

Figure 8:
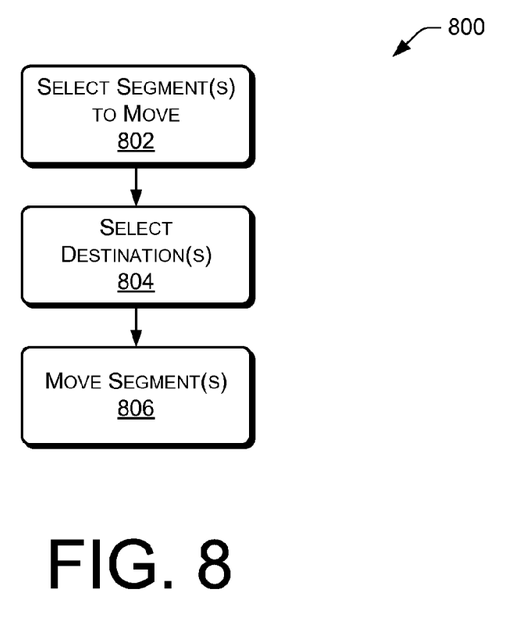
FIG. 8 is a flow diagram illustrating an example process 800 for moving segments.

FIG. 8 is a flow diagram illustrating an example process 800 for moving segments.

Segment(s) are selected at select segment(s) to move 802. The management process 114 may select the segment(s) to move by leveraging characteristics of direct segments described herein to simplify and expedite movement. In some examples, the process 800 may be performed in response to an administrator command of the management process 114 that specifies the segment(s) to move.

Compaction, the defragmentation process used to reduce external fragmentation by placing segments adjacent to each other to reduce holes between segments and to enlarge holes outside of segments, is performed by moving segments, and compaction routines may cause the movements described here.

Direct segments as described herein track occupancy as well as size. Therefore moving a direct segment may involve only moving the occupied parts of the direct segment, allowing the unoccupied part to be selectively moved. For example, performing the movement may include only moving valid pages paged within the occupied part. Similarly, the destination direct segment only needs to prepare the occupied part and may delay preparation of the unused part until demand arises. This contrasts with traditional direct segments that do not track occupancy, requiring preparing the entire destination segment and copying the entire contents of the direct segment. Accordingly, the cost to move a direct segment corresponds to the occupancy of the direct segment rather than the size of the direct segment, which compaction strategies may weigh to move segments differently and to move segments that might otherwise be too expensive to move.

Because the cost of moving a segment corresponds to occupancy, a movement strategy may include performing compaction or other movements in response to a call to FreeSegment( ) or FreeToPeak( ) as described more particularly with respect to the transitions 418, 424, and 430 and the transition 422, respectively. FreeSegment( ) eliminates occupancy, which simplifies compaction. FreeToPeak( ) reduces occupancy, which reduces the cost of compaction. In some examples, a low water mark following FreeToPeak( ) may be predicted by the management process 114 or indicated by the process associated with the direct segment, and compaction may be started in response to this prediction or indication.

At 804, select destination(s), destination(s) for the selected segment(s) are selected. Segments may be moved to destinations containing paged data in the unoccupied part of the destination segment without requiring the paged data to be evicted or invalidated, accordingly the definition of an appropriate candidate hole does not need to exclude those holes containing paged data. In some embodiments, the number of pages containing paged data and/or the status of the pages containing paged data may be used to calculate a weight to indicate a comparative cost of overlaying a segment on the pages. In some examples, the segment(s) to move may be selected by the administrator command of the management process 114.

At move segment(s) 806, the selected segment(s) are moved to the selected destination(s). Only the occupied part of the selected segment(s) need to be moved, though paged data in the unoccupied parts may be moved if desired according to usage characteristics or other heuristics for paging or other purposes. In some embodiments, paged data in the unoccupied parts may be moved asynchronously.

CONCLUSION

Although the techniques have been described in language specific to structural features and/or methodological acts, it is to be understood that the appended claims are not necessarily limited to the features or acts described. Rather, the features and acts are described as example implementations of such techniques.

All of the methods and processes described above may be embodied in, and fully automated via, software code modules executed by one or more general purpose computers or processors. The code modules may be stored in any type of computer-readable storage medium or other computer memory device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
  maintaining a multiplexed Translation Lookaside Buffer (TLB) that performs a direct mapping of a contiguous segment virtual address space associated with a user process, the direct mapping pinning the contiguous segment virtual address space in the multiplexed TLB;
  identifying an unused part of the contiguous virtual address space based on a partition code; and
  paging data, by an Operating System (OS) process, to the unused part of the contiguous segment virtual address space, the unused part of the contiguous segment virtual address space storing paged data responsive to the paging.

2. The method of claim 1, wherein the paging the data is performed in response to all non-segment pages in the multiplexed memory being occupied.

3. The method of claim 1, further comprising:
  identifying, by the OS process, a command associated with the user process being executed by a processor that includes the multiplexed TLB, the command including access to a specified part of the unused part of the contiguous segment virtual address space;
  removing or moving paged data stored in the specified part of the unused part of the contiguous segment virtual address space in response to the identifying; and
  changing the partition code to exclude the specified part from the unused part of the contiguous segment virtual address space.

4. The method of claim 1, further comprising:
  identifying, by the OS process, that a free part of the contiguous segment virtual address space is not used by the process; and
  changing the partition code to include the free part in the unused part of the contiguous segment virtual address space.

5. The method of claim 1, further comprising:
identifying, by the OS process, one or more pages of the unused part of the contiguous segment virtual address space; and
removing or moving paged data stored at the one or more pages identified.

6. The method of claim 5, further comprising determining a number of the one or more pages based at least in part on a write bandwidth or a copy bandwidth of a memory.

7. One or more computer storage media comprising computer-executable instructions that, when executed by one or more processors, direct the one or more processors to perform acts comprising:
maintaining a multiplexed Translation Lookaside Buffer (TLB) that performs a direct mapping of a contiguous virtual address space associated with a process and pins the direct mapping in the multiplexed TLB;
identifying an unused part of the contiguous virtual address space based on a partition code;
making the unused part of the contiguous virtual address space available to a management process for repurposing the unused part of the contiguous virtual address space for paging; and
paging data, by a management process, to the unused part of the contiguous virtual address space, the unused part of the contiguous virtual address space remaining available for direct mapping.

8. The one or more computer storage media of claim 7, wherein the paging the data is performed in response to non-segmented multiplexed memory of the multiplexed TLB being full.

9. The one or more computer storage media of claim 7, the acts further comprising:
identifying, by the management process, a command associated with the process executed by the one or more processors to access a specified part of the unused part of the contiguous virtual address space;
removing paged data stored in the specified part of the unused part of the contiguous virtual address space in response to the identifying; and
changing the partition code to exclude the specified part from the unused part of the contiguous virtual address space.

10. The one or more computer storage media of claim 7, the acts further comprising:
identifying, by the management process, that a free part of the contiguous virtual address space is not used by the process; and
changing the partition code to include the free part in the unused part of the contiguous virtual address space.

11. The one or more computer storage media of claim 7, wherein the partition code includes a partition address that defines the unused part of the contiguous virtual address space spanning from the partition address to a limit address, the acts further comprising:
identifying, by the management process, one or more pages of the unused part of the contiguous virtual address space within a particular distance from the partition address; and
removing or moving paged data stored at the one or more pages identified.

12. The one or more computer storage media of claim 11, wherein the direct mapping maps the one or more pages to a contiguous physical address space associated with a memory, and wherein the particular distance is based at least in part on a write bandwidth or a copy bandwidth of the memory.

13. The one or more computer storage media of claim 7, wherein the partition code includes a bit mask that defines the unused part of the contiguous virtual address space.

14. A system comprising:
one or more processors;
a Memory Management Unit (MMU) including registers storing a base address, a limit address, and a partition code, the registers defining a direct segment spanning from the base address to the limit address and defining a portion of the direct segment as an unused part of the direct segment based on the partition code; and
memory storing computer-executable instructions that, when executed by the one or more processors, direct the one or more processors to perform acts comprising:
associating the direct segment with a process; and
paging data, by a management process, to the portion of the direct segment, the portion of the direct segment storing page data while the portion of the direct segment remains defined as an unused part of the direct segment.

15. The system of claim 14, wherein the MMU includes an associative cache and wherein the paging the data to the unused part of the direct segment is performed in response to pages associated with a paged pure state or a paged in segment state being occupied.

16. The system of claim 14, the acts further comprising:
identifying, by the management process, a command associated with the process executed by the one or more processors to access a specified part of the unused part of the direct segment;
removing paged data stored in the specified part of the unused part of the direct segment; and
changing the partition code in the registers to exclude the specified part from the unused part of the direct segment.

17. The system of claim 14, the acts further comprising:
identifying, by the management process, that a free part of the direct segment is not used by the process; and
changing the partition code in the registers to include the free part in the unused part of the direct segment.

18. The system of claim 14, wherein the partition code includes at least one of an offset, a percentage, or a peak address that evaluates to a partition address that defines the unused part of the direct segment as spanning from the partition address to the limit address.

19. The system of claim 18, the acts further comprising:
identifying, by the management process, one or more pages of the unused part of the direct segment within a particular distance from the partition address; and
removing or moving paged data stored at the one or more pages identified.

20. The system of claim 19, wherein the one or more pages are associated with the memory and wherein the particular distance is based at least in part on a write bandwidth or a copy bandwidth of the memory.

* * * * *